US007575512B2

(12) United States Patent
Kennedy

(10) Patent No.: US 7,575,512 B2
(45) Date of Patent: Aug. 18, 2009

(54) MULTIPLAYER INTERACTIVE VIDEO GAMING DEVICE

(75) Inventor: Julian J. Kennedy, North Myrtle Beach, NC (US)

(73) Assignee: Vegas Amusement, Inc., Mountain Rest, SC (US)

( * ) Notice: Subject to any disclaimer, the term of this patent is extended or adjusted under 35 U.S.C. 154(b) by 743 days.

(21) Appl. No.: 11/063,251

(22) Filed: Feb. 23, 2005

(65) Prior Publication Data

US 2005/0266918 A1    Dec. 1, 2005

Related U.S. Application Data

(63) Continuation of application No. 10/354,174, filed on Jan. 30, 2003, now abandoned, which is a continuation of application No. 09/736,446, filed on Dec. 15, 2000, now Pat. No. 6,624,292, which is a continuation of application No. 08/862,444, filed on May 23, 1997, now abandoned, which is a continuation of application No. 08/540,328, filed on Oct. 6, 1995, now Pat. No. 5,688,174.

(51) Int. Cl.
*G06F 17/00* (2006.01)
(52) U.S. Cl. ...................................................... 463/12
(58) Field of Classification Search .............. 463/12–16
See application file for complete search history.

(56) References Cited

U.S. PATENT DOCUMENTS

| 6,371,483 | B1* | 4/2002 | Edmunds et al. | 273/292 |
|---|---|---|---|---|
| 6,435,507 | B1* | 8/2002 | Trucksess | 273/292 |
| 7,255,642 | B2* | 8/2007 | Sines et al. | 463/13 |
| 7,434,809 | B2* | 10/2008 | Silverman | 273/292 |
| 2002/0195773 | A1* | 12/2002 | Dunn | 273/274 |
| 2003/0199316 | A1* | 10/2003 | Miyamoto et al. | 463/35 |
| 2006/0084506 | A1* | 4/2006 | Yoseloff et al. | 463/42 |
| 2006/0142076 | A1* | 6/2006 | Willyard et al. | 463/11 |
| 2007/0072663 | A1* | 3/2007 | Kuhn et al. | 463/11 |
| 2007/0142107 | A1* | 6/2007 | Kuhn et al. | 463/16 |
| 2007/0218968 | A1* | 9/2007 | Snow et al. | 463/13 |
| 2007/0281786 | A1* | 12/2007 | Kuhn et al. | 463/31 |
| 2008/0113772 | A1* | 5/2008 | Burrill et al. | 463/25 |
| 2008/0161099 | A1* | 7/2008 | Sines et al. | 463/20 |

* cited by examiner

*Primary Examiner*—Ronald Laneau
(74) *Attorney, Agent, or Firm*—Jones, Tullar & Cooper, P.C.

(57) ABSTRACT

An improved multiplayer interactive video gaming device includes a plurality of independent player stations, each including at least one data input device configured to output a player input signal responsive to player activation. A computer game assembly executes a video card gaming program responsively to player game instructions. An interface assembly receives signals output by the plurality of player stations and outputs signals corresponding to particular data input devices. A personal computer assembly receives the output signals from the interface device via a data input port and executes the video card gaming program responsively thereto.

16 Claims, 2 Drawing Sheets

MULTIPLAYER INTERACTIVE VIDEO GAMING DEVICE

CROSS REFERENCE TO RELATED APPLICATIONS

This application is a Continuation under 35 U.S.C. 120 of U.S. application Ser. No. 10/354,174, filed Jan. 30, 2003 now abandoned, which is a Continuation of U.S. application Ser. No. 09/736,446, filed Dec. 15, 2000, now U.S. Pat. No. 6,624,292, which is a Continuation of U.S. application Ser. No. 08/862,444, filed May 23, 1997, now abandoned, which is a Continuation of U.S. application Ser. No. 08/540,328, filed Oct. 6, 1995, now U.S. Pat. No. 5,688,174.

BACKGROUND OF THE INVENTION

The present invention relates to video gaming systems and, more particularly, to improvements in a video gaming machine that permit a plurality of players to simultaneously participate in a game.

Many video gaming machines are configured for single players. For example, a video blackjack or poker game machine may have one player station from which a player participates in an independent game executed by the machine's game processor. While popular, such games do not provide the group interaction found in live casino games.

Moreover, single player games are often located in establishments frequented by groups of customers and thus may be unattractive to customers not wishing to separate from their companions.

Video gaming machines typically include a cabinet housing at least a player station, a game processor assembly and a video monitor. The player station includes at least one input device by which a player inputs commands to the game processor. Generally, these input devices are push-buttons that, when depressed and/or released, trigger switches that send a signal to the game processor. However, any suitable input device, for example a joystick or touch screen, may be utilized. The player station also typically includes a currency acceptor by which a player deposits coins or paper currency for betting or for paying a fee to play the game. The currency acceptor is often, but not necessarily, located proximate the input devices.

The game processor assembly is, generally, a computing assembly that includes an integrated circuit computing device that executes a video gaming program responsively to the commands input by the player at the player station. Often, this processor is a device, for example an erasable programmable read only memory (EPROM) which is custom programmed to execute only the video gaming program or related functions. The EPROM is a "chip" mounted on a custom built circuit board that may include various peripheral devices as needed or desired. The circuit board is constructed specifically to operate in conjunction with the video gaming machine and is typically capable of receiving the input signals directly from each input device. That is, a communication line directly links a single push-button to the circuit board.

Multiplayer video games are known which utilize custom circuitry such as EPROM arrangements. Due to its expense, however, custom circuitry may be impractical for game developers working in early development stages. Thus, some gaming programs are initially developed on conventional personal computers. These devices employ components such as a central processing unit (CPU), memory, and an input/output system. The CPU is an integrated circuit "chip." It is a processor device that can perform a multitude of operations. It is not a single-program device but, instead, executes programs stored in memory by a user. The input/output system manages data handling among the CPU and other internal or external components.

Because it is a multipurpose device, the personal computer assembly typically has no permanent input or output device having direct communication to the main circuit board. Instead, data is conveyed between input and output devices and the input/output system via data ports. These ports may have predetermined uses, for example to receive input from a keyboard or a mouse or to direct output to a printer or monitor. Personal computers also typically include expansion slots for additional circuit boards which may include their own data ports.

For example, computer software games are known which dedicate certain keys on a keyboard to individual players. However, a keyboard is inadequate for a video gaming machine, for example because of its physical awkwardness, because it would detract from game realism, and because it has no mechanism to receive currency for wagers or game fees.

Video gaming machines employing personal computer components without the addition of custom circuit boards or ports include means for conveying player input data to the CPU through existing components. For example, a currency acceptor may output data to the main circuit board via an existing serial port. However, multiplayer games include a relatively greater number of input devices such as push-buttons and, consequently, a correspondingly greater number of communication lines than required for a single player game. Because the existing input ports in a typical personal computer configuration are inadequate to directly accommodate these communication lines, an interface system is required to coordinate data transfer between the player stations and the data port(s).

For example, multiplayer interactive video gaming machines are known that employ a network arrangement. Players play individual games from individual player stations, each having a keypad, a personal computer circuit board, and a monitor. Input from the keypad switches is conveyed to the player station circuit board, which executes the individual player blackjack game responsively to this input data and data relating to the dealer's hand provided by a central file server computer. However, the multiple circuit boards contribute significantly to the costs of such a configuration, while the heat generated by the CPUs contributes to increased maintenance costs.

SUMMARY OF THE INVENTION

The present invention recognizes and addresses the foregoing disadvantages, and others of prior art construction and methods.

Accordingly, it is an object of the present invention to provide an improved multiplayer interactive video gaming device having a plurality of independent player stations and utilizing personal computer hardware.

More particularly, it is an object of the present invention to provide such a gaming device incorporating an improved interface assembly.

It is also an object of the present invention to provide an improved interface assembly that may communicate with the game processor via an input port of the personal computer assembly.

It is still another object of the present invention to provide a multiplayer interactive video gaming device which simulates a live casino game.

Some of these objects are achieved by a multiplayer interactive video gaming device including a plurality of independent player stations. Each of the player stations includes at least one data input device configured to output a player input signal responsive to player activation. An interface assembly is in operative communication with more than one of the player stations and includes an interface processor device. The interface processor device is configured to receive the player input signals and to output interface signals corresponding- to particular data input devices.

The gaming device also includes a personal computer assembly in communication with the interface assembly such that the interface assembly connects the more than one player stations with the personal computer assembly. The personal computer assembly includes an input/output system, at least one data input port, and a game processor device. The game processor device is configured to receive, via the data input port and the input/output system, data carried by the interface signals, to execute a video card gaming program responsively to the interface signal data, and to output video display signals responsively to the video card gaming program.

A video display assembly in communication with the personal computer assembly is configured to receive video display signals and to display video images responsively thereto.

In one preferred embodiment, three player stations communicate with one interface assembly. Each player station includes a plurality of switches. When depressed and/or released, each switch communicates a player input signal to an interface processor, a CPU forming a part of the interface device. The CPU, in turn, correlates the player input signal to a predetermined interface signal depending upon the switch from which the player input signal was received. The interface signal is then stored in a buffer. It is retrieved by a game CPU on the personal computer main circuit board via the personal computer keyboard port and basic input/output system (BIOS).

The CPU on the main circuit board executes the video gaming program responsively to information input by players through the individual player stations and outputs video display signals to a monitor viewable by all the players.

In another preferred embodiment of the present invention, each player station includes a currency acceptor configured to accept currency wagers from the player at the player station and to output a signal corresponding to the accepted currency amount to the main circuit board CPU via the interface device. Alternatively, data lines may be provided from the currency acceptors directly to data input ports to the main circuit board.

In still another preferred embodiment, a central ticket dispenser is mounted on the game cabinet within reach of all the player stations. A player that has accumulated winnings may input a command from the player station to clear the accumulated winnings maintained by the card gaming program and to output a ticket reflecting these winnings. The ticket may be redeemable, for example, by the establishment owner. A printer in communication with the main circuit board CPU is housed by the cabinet to print the tickets for output through the dispenser.

The cabinet may be constructed to provide a player portion that simulates a live casino card game table. The player portion has a semicircular shape, a foot rail, an arm rail, and drink holders disposed at each player station. Such a configuration adds to the realism of the game and to the group atmosphere.

The accompanying drawings, which are incorporated and constitute a part of the specification, illustrate one embodiment of the invention and, together with the description serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
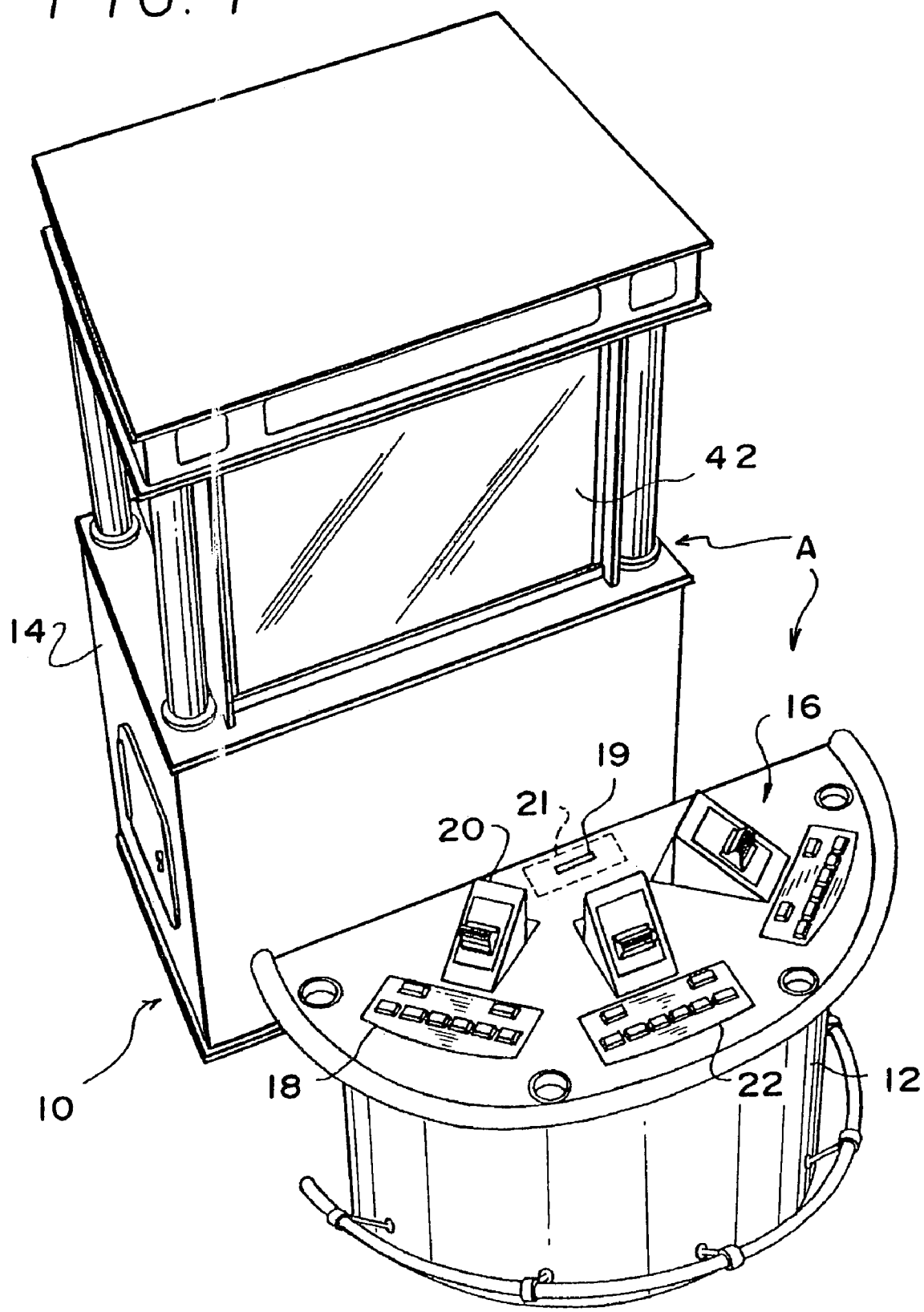
FIG. 1 is a perspective view of a preferred embodiment of a multiplayer interactive video gaming device constructed in accordance with the present invention.

Repeat use of reference characters in the present specification and drawings is intended to represent same or analogous features or elements of the invention.

DETAILED DESCRIPTION OF THE PREFERRED EMBODIMENTS

Reference will now be made in detail to the presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

The present invention is concerned with an improved multiplayer interactive video gaming device. Accordingly, FIG. 1 depicts a presently preferred embodiment of a multiplayer interactive video gaming device, indicated generally at 10. A cabinet A is divided into a player portion 12 and a display portion 14. Display portion 14 and player portion 2 are attached by a connection piece (not visible in the view shown) through which communication and power lines may be passed.

Player portion 12 is constructed to simulate a casino blackjack game table. Three player stations 16 are disposed on the top counter surface of player portion 12. Each player station 16 includes a keypad 18 and a currency acceptor 20. Each keypad 18 includes a plurality of input keys 22 by which players participate in the blackjack game. In the embodiment shown, the currency acceptor is a bill acceptor configured to receive bills of various denominations.

In this embodiment, each keypad 18 includes a first row of five, and a second row of two, input keys 22. It should be understood by those of ordinary skill in the art that the use, number, and arrangement of such keys can depend upon the nature of the video gaming program operated within the present invention. For example, a blackjack game may require the use of different keys for different purposes than a poker game. Bill acceptor 20 accepts bills for betting and/or game fee purposes.

A central ticket dispenser 19 is mounted on the cabinet within reach of all the player stations 16. Players may "cash out" at any time by inputting a proper command at their player station. Upon cashing out, a printer 21 mounted within player portion 12 prints a redeemable ticket indicating the player's winnings via ticket dispenser 19.

Figure 2:
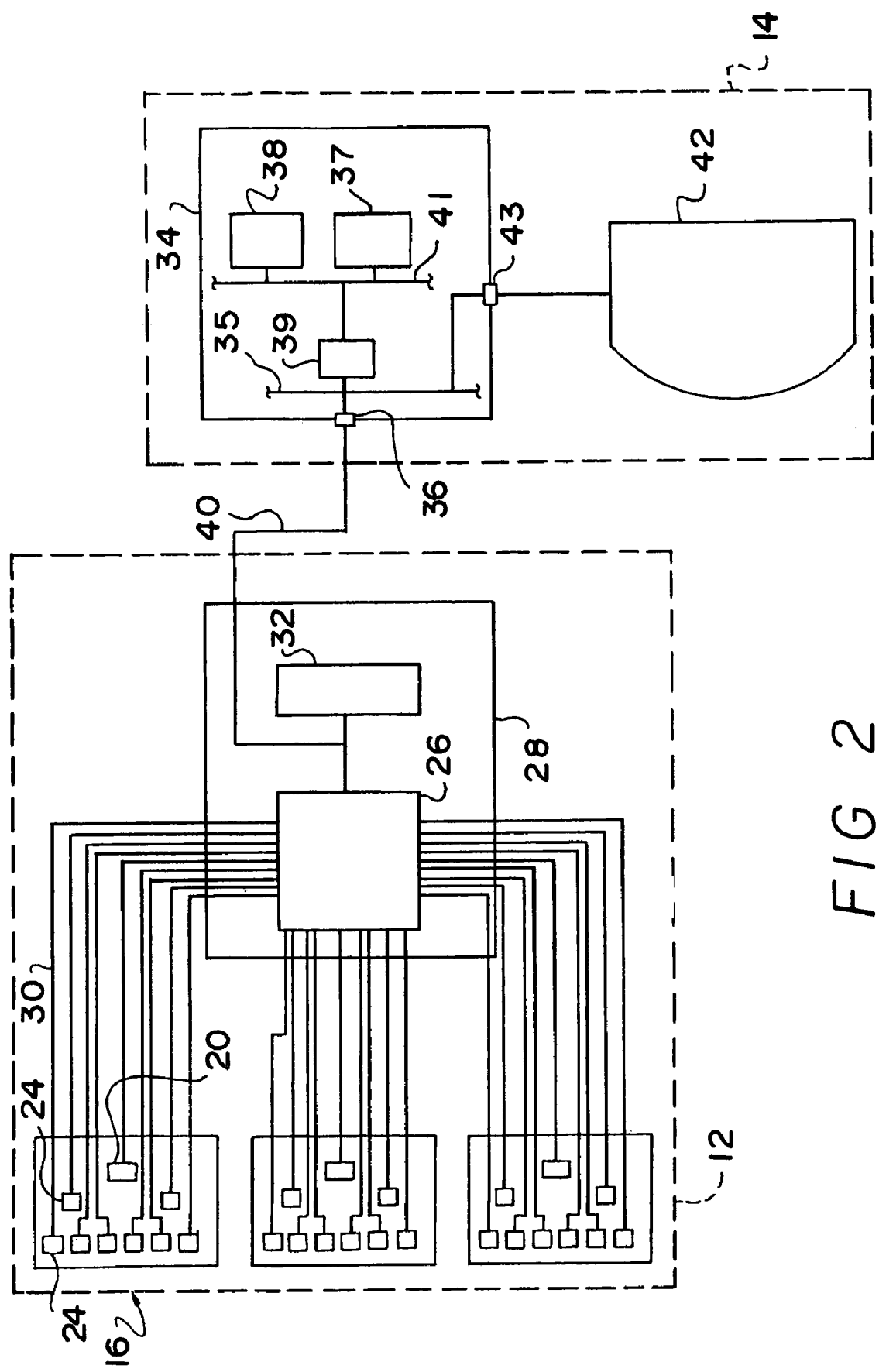
FIG. 2 is a schematic diagram of a preferred embodiment of a multiplayer interactive video gaming device constructed in accordance with the present invention.

Referring now to FIG. 2, keys 22 (FIG. 1) trigger compression switches 24 when activated by a player. Compression switches 24 communicate via communication lines 30 with an interface processor such as CPU 26 forming part of an interface device 28.

A compression switch 24 is triggered each time a player depresses and/or releases its corresponding key 22, thereby sending an electrical player input signal, for example a pulse or a change in current, to CPU 26 over its corresponding communication line 30. CPU 26, for example an INTEL 8048 device, is programmed to correlate a signal from a given compression switch 24 with a predetermined interface signal. For example, upon receiving a signal from a switch 24, CPU 26 may output a digital number peculiar to that particular switch.

Additionally, each bill acceptor 20 is configured to receive paper currency and to output a currency input signal corresponding to the amount of money input to the device. For example, bill acceptor 20 may output five pulses upon receiving a five dollar bill. Bill acceptors should be known and understood by those of ordinary skill in the art, and, thus, a detailed description of their operation is not provided herein.

CPU 26 also correlates the currency information to a currency output signal. Thus, upon receiving five pulses from a bill acceptor 20, CPU 26 may output five identical digital numbers.

CPU 26 outputs the interface and currency output signals to a buffer device 32 for storage. In this embodiment, the interface signals and currency output signals are all digital numbers. It should be understood, however, that any suitable coding method may be employed.

Player station 16 and interface device 28 are housed in player portion 12 of cabinet A (FIG. 1). A personal computer assembly 34 is housed in display portion 14 (FIG. 1). Personal computer assembly 34 may be a personal computer circuit board alone, or may include various peripheral elements such as a memory device. Personal computer assembly 34 includes a series of data ports. These ports may be configured, for example, for a variety of predetermined purposes, including receiving keyboard and mouse input and outputting monitor and printer output.

Personal computer assembly 34 houses a game processor such as a CPU 38 for executing a blackjack gaming program responsively to the information input by the players at player stations 16. An input/output system such as a BIOS 39 receives the interface and currency output signals from buffer 32 via a communication line 40, a keyboard port 36, and a bus 35. BIOS 39 outputs a signal to CPU 38 over a bus 41 to convey information carried by the interface signals and currency output signals to CPU 38. As should be understood by those of ordinary skill in the art, BIOS 39 may further decode or encode signals received by CPU 26 depending upon, for example, the requirements of CPU 38 and/or the number or sequences of activations of switches 24.

Moreover, a variety of circuitry configurations are possible within the range of personal computers. For example, a variety of input/output, memory (for example RAM 37), buses, and other devices may be arranged on circuit board 34 in various suitable configurations. Furthermore, various methods may be employed utilizing such devices and configurations in communicating information between keyboard port 36 and CPU 38. It should be understood that all suitable such personal computer configurations may be employed in accordance with the present invention.

As it executes the video card gaming program, CPU 38 outputs video display signals to a monitor 42 via a parallel port 43. The video card gaming program executed by CPU 38 permits interactive participation by a plurality of players at player stations 16.

The video card gaming program is preferably written in an "event-driven" language such as visual Basic or Visual C. An event-driven program performs operations responsively to "events," such as the depression of a push-button 22 that, in turn, causes BIOS 39 to output a signal to CPU 38. For example, the receipt of five signals from BIOS 39 corresponding to a particular bill acceptor 20 causes the program to add a five dollar credit for the player at the corresponding player station 16.

Although a variety of card gaming programs may be utilized in accordance with the present invention, in one presently preferred embodiment CPU 38 is configured to execute a blackjack game wherein the gaming program generates a "dealer's" blackjack hand on monitor 42 that is visible to the players at player stations 16. The players submit wagers, accept or reject card "hits", and select game options via keys 22 at player stations 16. The players' hands are displayed on monitor 42 along with the dealer's hand in a manner similar to the display of cards on a casino blackjack table. Various versions of the basic blackjack or "21" game are known and may be employed in accordance with the present invention.

While one or more preferred embodiments of the invention have been described above, it is to be understood that any and all equivalent realizations of the present invention are included within the scope and spirit thereof. For example, communication lines from the currency acceptors may be routed directly to one or more ports on the personal computer assembly, bypassing the interface assembly. This may be advantageous, for example, if large denomination bills are frequently inserted to the currency acceptors. Additionally, the currency acceptors may be configured to accept hard and/or paper currency. Thus, the embodiments depicted are presented by way of example only and are not intended as limitations upon the present invention. Thus, while particular embodiments of the invention have been described and shown, it will be understood by those of ordinary skill in this art that the present invention is not limited thereto since many modifications can be made. Therefore, it is contemplated that any and all such embodiments are included in the present invention as may fall within the literal or equivalent scope of the appended claims.

What is claimed is:

1. In a multiplayer interactive video gaming machine for playing a card game in which cards are at least initially dealt at least to each player, said machine having a player portion comprising a plurality of spatially separate player stations, the improvement comprising;

a single video display viewable from each of said player stations; and a processor programmed with steps for playing said card game for displaying simultaneously upon said single video display all cards that have been initially dealt to each player;

wherein cards are at least initially dealt to each player and to a dealer and wherein said processor displays simultaneously upon said single video display all cards that have been initially dealt to each player and to the dealer; and wherein said processor is programmed with steps for simulating the play of a live casino table card game and displays upon said single video display a simulation of the play of cards in said live casino table card game.

2. The improvement according to claim 1 wherein said processor displays simultaneously upon said single video display all cards that have been dealt that are currently in play.

3. The improvement according to claim 1 wherein said processor displays simultaneously upon said single video display all cards that have been dealt that are currently in play.

4. The improvement according to claim 1 wherein said card game consists essentially of Blackjack.

5. The improvement according to claim 1 wherein said card game consists essentially of Blackjack.

6. In a multiplayer interactive video gaming machine for playing a card game in which cards are at least initially dealt at least to each player, said machine having a player portion comprising a plurality of spatially separate player stations, the improvement consisting essentially of:
- a single video display viewable from each of said player stations; and
- a processor programmed with steps for playing said card game for displaying simultaneously upon said single video display all cards that have been initially dealt to each player;
- and wherein said processor is programmed with steps for simulating the play of a live casino table card game and displays upon said single video display a simulation of the play of cards in said live casino table card game.

7. The improvement according to claim 6 wherein cards are at least initially dealt to each player and to a dealer and wherein said processor displays simultaneously upon said single video display all cards that have been initially dealt to each player and to the dealer.

8. The improvement according to claim 6 wherein said processor displays simultaneously upon said single video display all cards that have been dealt that are currently in play.

9. The improvement according to claim 7 wherein said processor displays simultaneously upon said single video display all cards that have been dealt that are currently in play.

10. The improvement according to claim 6 wherein said card game consists essentially of Blackjack.

11. The improvement according to claim 6 wherein said card game consists essentially of Blackjack.

12. A multiplayer interactive video gaming machine for playing a card game in which cards are dealt at least to each player, said machine comprising;
- a player portion comprising a substantially semi-circular table and a plurality of independently operable player stations mounted substantially equiangularly about an arcuate periphery of said table, each said player station including a plurality of player activated controls by which each player can designate said player's decisions in connection with the play of said card game;
- a single display viewable from each of said player stations; and
- a processor programmed with steps for playing said card game and responsive to said player activated controls for displaying simultaneously upon said single video display all cards that have been dealt that are currently in play;
- and wherein said processor is programmed with steps for simulating the play of a live casino table card game and displays upon said single video display a simulation of the play of cards in said live casino table card game.

13. The machine according to claim 12 wherein said card game consists essentially of Blackjack.

14. The machine according to claim 12 wherein said single video display is positioned substantially adjacent to and substantially parallel to the linear periphery of said table.

15. The machine according to claim 12 wherein said single video display is positioned substantially adjacent to and substantially parallel to the linear periphery of said table.

16. The machine according to claim 13 wherein said single video display is positioned substantially adjacent to and substantially parallel to the linear periphery of said table.

* * * * *

(12) EX PARTE REEXAMINATION CERTIFICATE (9608th)
United States Patent
Kennedy

(10) Number: US 7,575,512 C1
(45) Certificate Issued: Apr. 23, 2013

(54) MULTIPLAYER INTERACTIVE VIDEO GAMING DEVICE

(75) Inventor: Julian J. Kennedy, North Myrtle Beach, NC (US)

(73) Assignee: Vegas Amusement, Inc.

Reexamination Request:
No. 90/009,737, May 28, 2010

Reexamination Certificate for:
Patent No.: 7,575,512
Issued: Aug. 18, 2009
Appl. No.: 11/063,251
Filed: Feb. 23, 2005

Related U.S. Application Data

(63) Continuation of application No. 10/354,174, filed on Jan. 30, 2003, now abandoned, which is a continuation of application No. 09/736,446, filed on Dec. 15, 2000, now Pat. No. 6,624,292, which is a continuation of application No. 08/862,444, filed on May 23, 1997, now abandoned, which is a continuation of application No. 08/540,328, filed on Oct. 6, 1995, now Pat. No. 5,688,174.

(51) Int. Cl.
*G06F 17/00* (2006.01)

(52) U.S. Cl.
USPC .......................................................... 463/12

(58) Field of Classification Search ........................ None
See application file for complete search history.

(56) References Cited

To view the complete listing of prior art documents cited during the proceeding for Reexamination Control Number 90/009,737, please refer to the USPTO's public Patent Application Information Retrieval (PAIR) system under the Display References tab.

*Primary Examiner* — Jeanne M Clark

(57) ABSTRACT

An improved multiplayer interactive video gaming device includes a plurality of independent player stations, each including at least one data input device configured to output a player input signal responsive to player activation. A computer game assembly executes a video card gaming program responsively to player game instructions. An interface assembly receives signals output by the plurality of player stations and outputs signals corresponding to particular data input devices. A personal computer assembly receives the output signals from the interface device via a data input port and executes the video card gaming program responsively thereto.

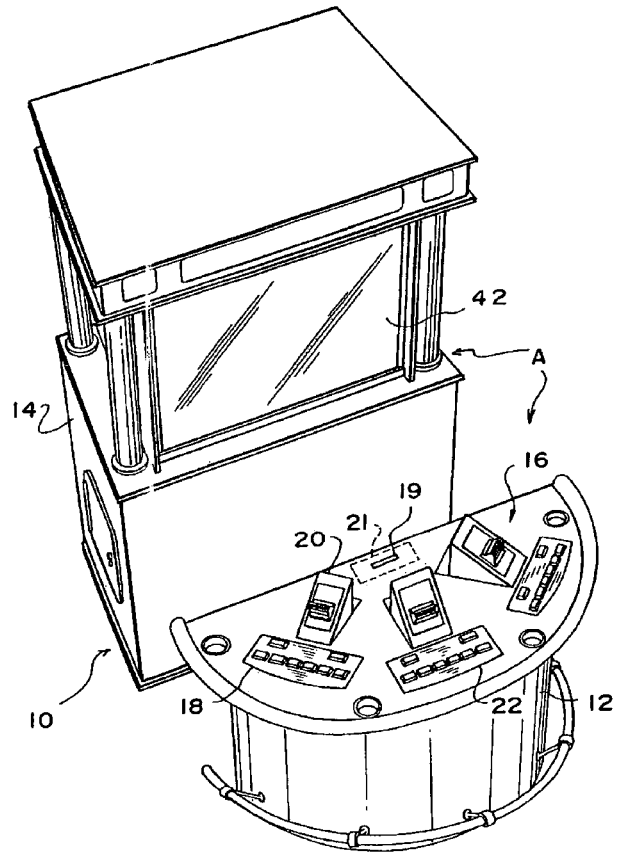

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-16 are cancelled.

\* \* \* \* \*